United States Patent
Braun et al.

(10) Patent No.: US 10,387,751 B2
(45) Date of Patent: Aug. 20, 2019

(54) METHODS, APPARATUSES, AND SYSTEMS FOR RECONSTRUCTION-FREE IMAGE RECOGNITION FROM COMPRESSIVE SENSORS

(71) Applicants: Henry Braun, Tempe, AZ (US); Pavan Turaga, Chandler, AZ (US); Andreas Spanias, Tempe, AZ (US); Cihan Tepedelenlioglu, Chandler, AZ (US)

(72) Inventors: Henry Braun, Tempe, AZ (US); Pavan Turaga, Chandler, AZ (US); Andreas Spanias, Tempe, AZ (US); Cihan Tepedelenlioglu, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/869,780

(22) Filed: Jan. 12, 2018

(65) Prior Publication Data
US 2018/0197046 A1    Jul. 12, 2018

Related U.S. Application Data

(60) Provisional application No. 62/445,423, filed on Jan. 12, 2017.

(51) Int. Cl.
*G06K 9/62* (2006.01)
*G06N 3/08* (2006.01)
(Continued)

(52) U.S. Cl.
CPC ............. *G06K 9/6255* (2013.01); *G06K 9/20* (2013.01); *G06K 9/4628* (2013.01); *G06K 9/627* (2013.01);
(Continued)

(58) Field of Classification Search
CPC .......................... G06K 9/6255; G06K 9/4628
See application file for complete search history.

(56) References Cited

U.S. PATENT DOCUMENTS 5,995,644 A * 11/1999 Lai ...................... G06K 9/3233
382/131
7,271,747 B2    9/2007 Baraniuk et al.
(Continued)

OTHER PUBLICATIONS

Anonymous, "Compressive Imaging: a New Single-Pixel Camera," Accessed from the Internet on May 1, 2019, URL <http://web.archive.org/web/20161012055608/http://dsp.rice.edu/cscamera>.
(Continued)

*Primary Examiner* — Chan S Park
*Assistant Examiner* — Mai H Tran
(74) *Attorney, Agent, or Firm* — Norton Rose Fulbright US LLP

(57) ABSTRACT

The disclosure relates to an image recognition algorithm implemented by a hardware control system which operates directly on data from a compressed sensing camera. A computationally expensive image reconstruction step can be avoided, allowing faster operation and reducing the computing requirements of the system. The method may implement an algorithm that can operate at speeds comparable to an equivalent approach operating on a conventional camera's output. In addition, at high compression ratios, the algorithm can outperform approaches in which an image is first reconstructed and then classified.

13 Claims, 4 Drawing Sheets

(51) Int. Cl.
  G06N 3/04    (2006.01)
  G06K 9/20    (2006.01)
  G06K 9/46    (2006.01)
(52) U.S. Cl.
  CPC ......... G06K 9/6231 (2013.01); G06K 9/6268 (2013.01); G06N 3/04 (2013.01); G06N 3/0454 (2013.01); G06N 3/0472 (2013.01); G06N 3/08 (2013.01); G06N 3/084 (2013.01)

(56) References Cited

U.S. PATENT DOCUMENTS

| | | | |
|---|---|---|---|
| 7,511,643 | B2 | 3/2009 | Baraniuk et al. |
| 8,199,244 | B2 | 6/2012 | Baraniuk et al. |
| 8,970,742 | B2 | 3/2015 | Horikawa et al. |
| 2005/0089215 | A1* | 4/2005 | Staelin ............ H04N 19/86 382/157 |
| 2007/0076959 | A1* | 4/2007 | Bressan ............ H04N 19/176 382/224 |
| 2007/0239638 | A1* | 10/2007 | Zhuang ............ G06F 16/353 706/20 |
| 2012/0076401 | A1* | 3/2012 | Sanchez ............ G06K 9/4676 382/159 |
| 2013/0036084 | A1* | 2/2013 | Lee ............ H04B 1/66 706/52 |
| 2016/0123943 | A1* | 5/2016 | Li ............ G06N 3/084 702/31 |
| 2016/0135729 | A1* | 5/2016 | Mestha ............ A61B 5/4312 600/408 |
| 2016/0217369 | A1* | 7/2016 | Annapureddy ........ G06N 3/082 |
| 2017/0032222 | A1* | 2/2017 | Sharma ............ G06K 9/6256 |
| 2017/0076196 | A1* | 3/2017 | Sainath ............ G06N 3/084 |
| 2017/0093603 | A1* | 3/2017 | Hu ............ H04B 1/69 |
| 2018/0182071 | A1* | 6/2018 | Ayari ............ G06T 5/002 |
| 2018/0197046 | A1* | 7/2018 | Braun ............ G06N 3/0454 |
| 2018/0198994 | A1* | 7/2018 | Cardinaux ............ H03M 7/3062 |
| 2018/0268567 | A1* | 9/2018 | Hart ............ G06T 7/90 |
| 2019/0080205 | A1* | 3/2019 | Kaufhold ............ G06K 9/6257 |

OTHER PUBLICATIONS

Anonymous, "PETS: Performance Evaluation of Tracking and Surveillance," Published Oct. 12, 2016, Accessed from the Internet on Apr. 7, 2019, URL <www.cvg.reading.ac.uk/slides/pets.html > Last updated Nov. 4, 2005.

Baker & Matthews, "Lucas-Kanade 20 Years on: A Unifying Framework" *International Journal of Computer Vision*, 2004, 56(3):221-255.

Baker et al., "A Database and Evaluation Methodology for Optical Flow" *Int. J. Comput. Vis.*, 2011, 92:1-31.

Banavar et al., "Embedding android Signal Processing Apps in a High School Math Class — An RET Project" *Proceedings—Frontiers in Education Conference, FIE*, 2015, 4 pages.

Baraniuk et al., "Model-Based Compressive Sensing" *IEEE Transactions on Information Theory*, 2010, 56(4):1982-2001.

Berman et al., "Volumetric MRI of the Lungs During Forced Expiration" *Magnetic Resonance in Medicine*, 2016, 75:P2295-2302.

Bingham & Mannila, "Random projection in dimensionality reduction: Applications to image and text data" *Proceedings of the seventh ACM SIGKDD International Conference on Knowledge Discovery and Data Mining*, 2001, 245-250.

Block et al., "Undersampled Radial Mri with Multiple Coils. Iterative Image Reconstruction Using a Total Variation Constraint" Magnetic Resonance in Medicine, 2007, 57:1086-1098.

Braun et al., "Direct Classification from Compressively Sensed Images via Deep Boltzmann Machine" *Asilomar*, 2016, 454-457.

Braun et al., "Direct Tracking from Compressive Imagers: A Proof of Concept" *IEEE ICASSP*, 2014, 8139-8142.

Braun et al., "Irradiance Estimation for a Smart PV Array" 2015 *IEEE Energy Conversion Congress and Exposition, ECCE*, 2015, pp. 1095-1099.

Braun et al., "Optical Flow for Compressive Sensing Video Reconstruction" *ICASSP*, 2013, 2267-2271.

Braun et al., "Signal Processing for Fault Detection in Photovoltaic Arrays" *ICASSP, IEEE International conference on Acoustics, Speech and Signal Processing—Proceedings*, 2012, pp. 1681-1684.

Braun et al., "Signal Synthesis Processing for Solar Array Monitoring, Fault Detection Optimization" *Synthesis Lectures on Power Electronics*, Morgan & Claypool Publishers, 2012, 95 pages.

Braun et al., "Topology reconfiguration for optimization of photovoltaic array output" *Sustainable Energy, Grids and Networks*, 2016, 6:58-69.

Braun, Henry, "Image Reconstruction, Classification, and Tracking for Compressed Sensing Imaging", Doctor of Philosophy- Final Oral Defense, Nov. 2016, 101 pages.

Braun, Henry, "Image Reconstruction, Classification, and Tracking for Compressed Sensing Imaging", Doctor of Philosophy- Dissertation, Dec. 2016 (published Dec. 2018), 121 pages.

Buddha et al., "Signal Processing for Photovoltaic Applications," 2012 *IEEE International Conference on Emerging Signal Processing Applications, ESPA2012-Proceedings*, pp. 115-118.

Calderbank et al., "Construction of a Large Class of Deterministic Sensing Matrices That Satisfy a Statistical Isometry Property" *IEEE Journal of Selected Topics in Signal Processing*, 2010, 4(2):358-374.

Candès & Romberg, "l1-magic: Recovery of Sparse Signals via Convex Programming" Technical Report, 2005, 19 pages.

Candès & Tao, "Decoding by Linear Programming," *IEEE Transactions on Information Theory*, 2005, 51(12):4203-4215.

Candès et al., "Near-Optimal Signal Recovery From Random Projections: Universal Encoding Strategies?" *IEEE Transactions on Information Theory*, 2006, 52(12):5406-5424.

Candès, Emmanuel, "The restricted isometry property and its implications for compressed sensing" *C. R. Acad. Sci. Paris, Ser. I*, 2008, 346:589-592.

Chang et al., "MR Image Reconstruction from Sparse Radial Samples Using Bregman Iteration," *Proc. Intl. Soc. Mag. Reson. Med.*, 2006, 14:969.

Chartrand & Yin, " Iteratively reweighted algorithms for compressive sensing" *ICASSP*, 2008, 3869-3872.

Cooper, Gregory, "The Computational Complexity of Probabilistic Inference Using Bayesian Belief Networks" *Artificial Intelligence*, 1990, 42:393-405.

Dahl et al., "Large-Scale Malware Classification Using Random Projections and Neural Networks" *ICASSP*, 2013, 3422-3426.

Daubechies, Ingrid, "The Wavelet Transform, Time-Frequency Localization and Signal Analysis" *IEEE Transactions on Information Theory*, 1990, 36(5):961-1005.

Davenport et al., "Signal Processing With Compressive Measurement" *IEEE Journal of Selected Topics in Signal Processing*, 2010, 4(2):445-460.

Davenport et al., "The Compressive Matched Filter" Technical Report, 2006, 16 pages.

Davenport et al., "The Smashed Filter for Compressive Classification and Target Recognition" *Proc. SPIE Computational Imaging V.*, 2007, 12 Pages.

Do Ba et al., "Lower bounds for sparse recovery" SODA '10 Proceedings of the twenty-first annual ACM-SIAM symposium on Discrete algorithms, 2010, pp. 1190-1197.

Donoho & Tanner, "Counting Faces of Randomly Projected Polytopes when the Projection Radically Lowers Dimension," *Journal of the American Mathematical Society*, 2009, 22(1):1-53.

Donoho & Tanner, "Observed universality of phase transitions in high-dimensional geometry, with implications for modern data analysis and signal processing" *Phil. Trans. R. Soc. A.*, 2009, 367:4273-4293.

Donoho et al., "Message Passing Algorithms for Compressed Sensing" *PNAS*, 2009, 160(45):18914-18919.

Donoho et al., "Message Passing Algorithms for Compressed Sensing: I. Motivation and Construction" IEEE 2010, 5 pages.

(56) References Cited

OTHER PUBLICATIONS

Donoho et al., "Sparse Solution of Underdetermined Systems of Linear Equations by Stagewise Orthogonal Matching Pursuit" *IEEE Transactions on Information Theory*, 2012, 58(2):1094-1121.

Donoho et al., "The Noise-Sensitivity Phase Transition in Compressed Sensing" *IEEE Transactions on Information Theory*, 2011, 57(10):6920-6941.

Donoho, David "Compressed Sensing" *IEEE Transactions on Information Theory*, 2006, 52(4):1289-1306.

Fain et al., "Correction for Artifacts in 3D Angularly Undersampled MR Projection Reconstruction" *Proc. Intl. Soc. Mag. Reson.*, 2001, 9:759.

Figueiredo et al., "Gradient Projection for Sparse Reconstruction: Application to Compressed Sensing and other Inverse Problems" *IEEE Journal of Selected Topics in Signal Processing*, 2007, 1(4):586-597.

Figueiredo, Mario, "Adaptive Sparseness Using Jeffreys Prior" *Advances in Neural Information Processing Systems*, 2002, 14, 8 pages.

Fischler & Bolles, "Random Sample Consensus: A Paradigm for Model Fitting with Applications to Image Analysis and Automated Cartography," *Graphics and Image Processing*, 1981, 24(6):381-395.

Forsyth et al., "Computer Vision—ECCV 2008" $10^{th}$ *European Conference on Computer Vision*, 2008 Proceedings, Part II, 32 Pages.

Gan et al., "Analysis of the Statistical Restricted Isometry Property for Deterministic Sensing Matrices using Stein's Model" 2009, 5 pages.

Gao et al., "Dimensionality reduction via compressive sensing" *Pattern Recognition Letters*, 2012, 33:1163-1170.

Ghanbari, M., "The Cross-Search Algorithm for Motion Estimation" *IEEE Transaction on Communications*, 1990, 38(7):950-953.

Gleichman & Eldar, "Blind Compressed Sensing" *IEEE Transactions on Information Theory*, 2011, 58(10):6958-6975.

Glover, Gary H., "Simple Analytic Spiral K-Space Algorithm" *Magnetic Resonance in Medicine*, 1999, 42:412-415.

Goyette et al., "Changedetection.net: A New Change Detection Benchmark Dataset" *IEEE Conference on Computer Vision and Pattern Recognition*, 2012, 10 Pages.

Guo et al., "Asymptotic Mean-Square Optimality of Belief Propagation for Sparse Linear Systems" *Proceedings of 2006 IEEE Information Theory Workshop*, 2006, 194-198.

Han et al., "Gradient Sparsity for Piecewise Continuous Optical Flow Estimation" 2011 $18^{th}$ *IEEE International Conference on Image Processing*, 2011, pp. 2341-2344.

Hare et al., "Struck: Structured Output Tracking with Kernels" 2011 *IEEE International Conference on Computer Vision*, 2011, pp. 263-270.

Haupt et al., "Compressive Sampling for Signal Classification," Conference Paper, 2006, pp. 1430-1434.

Hinton, Geoffrey, "Training Products of Experts by Minimizing Contrastive Divergence," *Journal of Neural Computation*, 2002, 14(8):1771-1800.

Isard & Blake, "Condensation —Conditional Density Propagation for Visual Tracking" *International Journal of Computer Vision*, 1998, 29(1):5-28.

Jacobs et al., "Compressive Sensing and Differential Image-Motion Estimation" *ICASSP*, 2010, 718-721.

Jain & Jain, "Displacement Measurement and its Application in Interframe Image Coding" *IEEE Transactions on Communications*, 1981, 29(12):1799-1808.

Ji et al., "Bayesian Compressive Sensing" *IEEE Transactions on Signal Processing*, 2008, 56(6):2346-2356.

Johnson et al., "Optimization OT -MACH filter generation for target recognition" *Proc. of. SPIE*, 2009, 7340, 10 pages.

Kalman, R E "A , New Approach to Linear Filtering and Prediction Problems" Journal of Basic 35-45.Engineering, 1960,.

Krishnan et al., "A comprehensive monitoring system for photovoltaic arrays," *Proceedings Computer Graphics and Imaging*, 2013, 5 pages.

Kulkarni & Turaga, "Reconstruction-Free Action Inference from Compressive Imagers" *IEEE Transactions on Pattern Analysis and Machine Intelligence*, 2016, 38(4):772-784.

Lee & Bresler, "ADMiRA: Atomic Decomposition for Minimum Rank Approximation" *IEEE Transactions on Informaion Theory*, 2010, 56(9):4402-4416.

Lee et al., "Dynamic Search-Window Adjustment and Interlaced Search for Block-Matching Algorithm" *IEEE Transactions on Circuits and Systems for Video Technology*, 1993, 3(1):85-87.

Lewis & Knowles "Image Compression Using the 2-D wavelet Transform" *IEEE Transactions on Image Processing*, 1992, 1(2):244-250.

Li et al., "A New Three-Step Search Algorithm for Block Motion Estimation" *IEEE Transactions on Circuits and Systems for Video Technology*, 1994, 4(4):438-442.

Li et al., "Compressive image acquisition and classification via secant projections" *J. Opt.*, 2015, 17:065701.

Li et al., "Real-time Visual Tracking Using Compressive Sensing" *IEE Conference on Computer Vision and Pattern Recognition*, 2011, 1305-1312.

Lin et al., "Optimization of a multi -stage ATR system for small target identification," *SPIE Defense, Security, and Sensing Conference*, 2010, vol. 7696C: 10 pages.

Liu & Chen, "Sequential Monte Carlo Methods for Dynamic Systems" *Journal of the American Statistical Association*, 1998, 93(443):1032-1044.

Lohit et al., "Reconstruction-free Inference on Compressive Measurements" *IEE Compouter Society Conference on Computer Vision and Pattern Recognition Workshops*, 2015, 16-24.

Lucas & Kanade, "An Iterative Image Registration Technique with an Application to Stereo Vision," *Proc. $7^{th}$ Intl. Joint Conf. on Artificial Intelligence (IJCAI)*, 1981, 674-679.

Lustig et al., "Compressed Sensing MRI. A look at how CS can improve on current imaging techniques" *IEEE Signal Processing Magazine*, 2008, 72-82.

Lustig et al., "Faster Imaging with Randomly Perturbed, undersampled Spirals and |L|_1 Reconstruction" *Proceedings of the $13^{th}$ Annual Meeting of ISMRM*, 2005, 1 page.

Lustig et al., "Sparse MRI: The Application of Compressed Sensing for Rapid MR Imaging" *Magnetic Resonance in Medicine*, 2007, 58:1182-1195.

Mahalanobis & Kumar, "Optimality of the maximum average correlation height filter for detection of targets in noise" *Opt. Eng.*, 1997, 36(10):2642-2648.

Mahalanobis et al., "Unconstrained Correlation filters" *Applied Optics*, 1994, 33(17):3751-3759.

McEliece et al., "Turbo Decoding as an Instance of Pearl's 'Belief Propagation' Algorithm" *IEEE Journal on Selected Areas in Communications*, 1998, 16(2):140-152.

Montanari et al., "Belief Propagation Based Multi-User Detection" $43^{rd}$ *Allerton Conference on Communications, Control and Computing*, 2006, 9 pages.

Murphy et al., "Loopy Belief Propagation for Approximate Inference: An Empirical Study" *Proceedings of the $15^{th}$ Conference on Uncertainty in Artificial Intelligence*, 2013, 467-475.

Needell & Tropp, "CoSaMP: Iterative signal recovery from incomplete and inaccurate samples" *Applied and Computational Harmonic Analysis*, 2009, 26:301-321.

Needell & Vershynin, "Uniform Uncertainty Principle and Signal Recovery via Regularized Orthogonal Matching Pursuit," *Foundations of Computational Mathematics*, 2009, 9:317-334.

Olhausen & Field, "Sparse Coding with an Overcomplete Basis Set: A Strategy Employed by VI?" *Vision Res.*, 1997, 37(23):331-3325.

Ortiz & Becker, "Face recognition for web-scale datasets," *Computer Vision and Image Understanding*, 2014, 118:153-170.

Parker et al., "Bilinear Generalized Approximate Message Passing," IEEE Transactions on Signal Processing, 2014, 26 pp.

(56) References Cited

OTHER PUBLICATIONS

Pati et al., "Orthogonal Matching Pursuit: Recursive Function approximation with Applications to Wavelet Decomposition" *Proceedings of the 27th Asilomar Conference on Signals, Systems and Computers*, 1993, 40-44.

Pearl, Judea, "Revered Baynes on Inference Engines: A Distributed Hierarchical Approach" *AAAI-82 Proceedings*, 1982, 133-136.

Peshin et al., "A photovoltaic (PV) array monitoring simulator," *Proceedings of the IASTED International Conference Modelling, Identification and Control, MIC* 2015, pp. 180-186.

Polonia, L.F. "Exploiting Prior Knowledge in Compressed Sensing Wireless ECG Systems" Dissertation submitted to the Faculty of the University of Delaware, 2015, 143 Pages.

Rangan, Sundeep, "Estimation with Random Linear Mixing, Belief Propagation and Compressed Sensing" 2010 *44th Annual Conference on Information Sciences and Systems*, 2010, 6 pages.

Rangan, Sundeep, "Generalized Approximate Message Passing for Estimation with Random Linear Mixing" *IEEE International Symposium on Information Theory Proceedings*, 2010, 2168-2172.

Rodriguez et al., "Action MACH. A Spatio-temporal Maximum Average correlation Height Filter for Action Recognition" *Computer vision and Pattern Recognition*, 2008, 8 pages.

Salakhutdinov & Hinton, "Deep Boltzmann Machines" *Proceedings of the 12th International Conference on Artificial Intelligence*, 2009, 448-455.

Salmond & Birch, "A particle filter for track-before-detect" *Proceedings of the American Control Conference*, 2001, 3755-3760.

Sankaranarayanan, A. C., "CS-MUVI: Video Compressive Sensing for Spatial-Multiplexing Cameras" *Proceedings of the IEEE International Conference Computational Photography*, 2012, 1-10.

Santos et al., "Single Breath-Hold Whole-Heart MRA Using Variable-Density Spirals at 3T" *Magnetic Resonance in Medicine*, 2006, 55:371-379.

Shen & Wu, "Sparsity Model for Robust Optical Flow Estimation at Motion Discontinuities," *Proceedings IEEE Computer Society Conference on Computer Vision and Pattern Recognition*, 2010, 8 pages.

Srinivasan & Rao, "Predictive Coding Based on Efficient Motion Estimation" *IEEE Transactions on Communications*, 1985, COM-33(8):888-896.

Sturm et al., "Cyclic Pure Greedy Algorithms for Recovering Compressively Sampled Sparse Signals," *Asilomar Conference on Signals, Systems and Computers*, 2011, 1143-1147.

Takhar et al., "A New Compressive Imaging Camera Architecture using Optical-Domain Compression" *Proc. Computational Imaging IV*, 2006, 10 pages.

Thirumalai & Frossard, "Correlation Estimation from Compressed Images," *IEEE ICASSP*, 2011, 16 pages.

Tichasvsky et al., "Posterior Cramér-Rao Bounds for Discrete-Time Nonlinear Filtering" *IEEE Transactions on Signal Processing*, 1998, 46(5):1386-1396.

Tramel et al., "Approximate Message Passing with Restricted Boltzmann Machine Priors," *Journal of Statistical Mechanics: Theory and Experiment*, 2015, 22 pages.

Tramel, E.W., "Inferring Sparsity: Compressed Sensing Using Generalized restricted Boltzmann Machines" *iTwist*, 2016, 33 pages.

Tramel, E.W., "Inferring Sparsity: Compressed Sensing Using Generalized restricted Boltzmann Machines" IEEE Information Theory Workshop, 2016, 5 pages.

Tropp & Gilbert, "Signal Recovery From Random Measurements Via Orthogonal Matching Pursuit," *IEEE Transactions on Information Theory*, 2007, 53(12):4655-4666.

Van Den Berg & Friedlander, "Probing the Pareto Frontier for Basis Pursuit Solutions," *SIAM J. Sci. Comput.*, 2008, 31(2):890-912.

Van Den Berg, "SPGL1: A solver for large-scale sparse reconstruction" Accessed from the Internet on Apr. 7, 2019, URL: <https://web.archive.org/web/20170106142811/http://cs/ubc/ca/~mpf/spgl1 >.

Vasanawala et al., "Practical Parallel Imaging Compressed Sensing MRI: Summary of Two Years of Experience in Accelerating Body MRI of Pediatric Patients" *Proceedings IEEE International Symposium on Biomedical Imaging: from nano to macro*, 2011, 1039-1043.

Vila & Schniter, "Expectation-Maximization Gaussian-Mixture Approximate Messgae Passing" *IEEE Transactions on Signal Processing*, 2013, 61(19):4658-4672.

Viola & Jones, "Rapid Object Detection using a Boosted Cascade of Simple Features" *Proceedings of the 2001 IEEE Computer Society Conference on Computer Vision and Pattern Recognition*, 2001, I511-I518.

Wakin et al., "An architecture for Compressive Imaging," *Image Processing*, 2006, 1273-1276.

Wang et al., "Guest Editorial: Compressive Sensing for Biomedical Imaging," *IEEE Transactions on medical imaging*, 2011, 30(5):1013-1016.

Waters et al., "SpaRCS: Recovering Low-Rank and Sparse Matrices from Compressive Measurements" *Neural Information Processing Systems (NIPS)*, 2011, 1089-1097.

Weiss, Yair, "Correctness of Local Probability Propagation in Graphical Models with Loops" *Neural Computation*, 2000, 12:1-41.

Wright et al., "Robust Face Recognition via Sparse Representation," *IEEE Transactions on Pattern Analysis and Machine Intelligence*, 2009, 31(2):210-227.

Ye et al., "Projection Reconstruction MR Imaging Using FOCUSS" *Magnetic Resonance in Medicine*, 2007, 57:764-775.

Zayyani et al., "Bayesian Cramér-Rao Bound for Noisy Non-Blind and Blind Compressed Sensing" *IEEE Signal Processing Letters*, 2009, 10 pages.

Zhang et al., "Real-Time Compressive Tracking" *ECCV*, 2012, 864-877.

Zhou et al., "Development of streamlined OT-MACH-based ATR algorithm for grayscale optical correlator" *Proceedings of SPIE, Optical Pattern Recognition*, 2005, 78-83.

Zhu & Ma, "A New Diamond Search Algorithm for Fast Block-Matching Motion Estimation," *IEEE Transactions on Image Processing*, 2000, 9(2):287-290.

* cited by examiner

METHODS, APPARATUSES, AND SYSTEMS FOR RECONSTRUCTION-FREE IMAGE RECOGNITION FROM COMPRESSIVE SENSORS

CROSS-REFERENCE TO RELATED APPLICATIONS

This application claims priority to U.S. Provisional Application No. 62/445,423 filed Jan. 12, 2017, the content of which is incorporated herein by reference in its entirety.

FIELD OF THE DISCLOSURE

This disclosure relates generally to methods, apparatuses, and systems for reconstruction-free image recognition from compressive sensors. An object of the embodiments of this disclosure is to achieve direct processing of compressed image data without full image reconstruction.

BACKGROUND

Compressed sensing (CS) has recently emerged as a widely studied area of signal processing. In CS, a sensor does not output the signal of interest, but rather a vector of measurements, each of which is a different "mixture" of the components of the signal of interest. The growth of CS as an area of research has been fueled by the discovery that many naturally occurring signals can be reconstructed from fewer measurements than the length of the signal, and that measurements can be chosen with little knowledge of the signal's characteristics. CS reconstruction algorithms typically exploit knowledge of the compressibility of a signal. For instance, the wavelet transform of a natural image packs most of the signal energy in a small number of high magnitude components, with most components being nearly zero. That is, the wavelet transform of a natural image tends to be sparse. The image can be reconstructed from fewer CS measurements than the number of image pixels by choosing the image with the sparsest wavelet transform from among the infinite number of possible solutions to the underdetermined system. However, this reconstruction requires solving a nonlinear and computationally expensive optimization problem, leading to high computational requirements and/or low throughput in systems employing CS sensors.

BRIEF SUMMARY

In some embodiments of the present disclosure, a method for reconstruction-free image recognition may be performed that comprises receiving, by a control system comprising at least one processor, an uncompressed dataset; training, by the control system, one or more of a machine-learning based classifier, detector, and estimator with the uncompressed dataset; determining, by the control system, an orthogonal sensing matrix from the uncompressed dataset; receiving, by the control system, a compressed version of the uncompressed dataset; and training, by the control system, the one or more machine-learning based classifier, detector, and estimator with the compressed dataset. In some embodiments, the training with the uncompressed dataset comprises determining, by the control system, one or more initial network weights; and generating, by the control system, a base network based on the determined one or more initial network weights. In some embodiments, the training with the compressed dataset comprises executing, by the control system, one or more backpropagation processes on the compressed dataset.

In some embodiments, the method further comprises determining, by the control system, an initial guess for a compressive network based on the one or more initial network weights. In some embodiments, the determining the initial guess comprises multiplying, by the control system, the one or more initial network weights by the orthogonal sensing matrix and a normalization factor. In some embodiments, the normalization factor is a square root of a compression ratio of the compressed dataset. In some embodiments, the method further comprises determining, by the control system, one or more compressive network weights based on a result of the one or more backpropagation processes.

In some embodiments, the method further comprises determining, by the control system, an initial guess for a compressive network based on the one or more initial network weights. In some embodiments, the method further comprises receiving, by the control system, a compressed dataset from a compressed image sensor; and classifying, by the control system, compressed data in the compressed dataset without reconstruction of the compressed data. In some embodiments, the one or more machine-learning based classifier, detector, and estimator comprises a neural network. In some embodiments, the one or more machine-learning based classifier, detector, and estimator comprises a generative, stochastic neural network. In some embodiments, the one or more machine-learning based classifier, detector, and estimator comprises a deep Boltzmann machine (DBM).

In some embodiments, a system for reconstruction-free image recognition comprises one or more compressed image sensors; and a control system comprising at least one processor. In some embodiments, the control system is configured to receive an uncompressed dataset; train one or more of a machine-learning based classifier, detector, and estimator with the uncompressed dataset; determine an orthogonal sensing matrix from the uncompressed dataset; receive a compressed version of the uncompressed dataset; train the one or more machine-learning based classifier, detector, and estimator with the compressed dataset; receive a compressed dataset from the one or more compressed image sensors; and classify compressed data in the compressed dataset without reconstruction of the compressed data.

The foregoing has outlined rather broadly the features and technical advantages of the present disclosure in order that the detailed description that follows may be better understood. Additional features and advantages of the disclosed embodiments will be described hereinafter that form the subject of the claims of the disclosure. It should be appreciated by those skilled in the art that the conception and specific embodiments disclosed may be readily utilized as a basis for modifying or designing other structures for carrying out the same purposes of the present disclosed embodiments. It should also be realized by those skilled in the art that such equivalent constructions do not depart from the spirit and scope of the disclosed embodiments as set forth in the appended claims. The novel features that are believed to be characteristic of the disclosed embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosed embodiments.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the disclosed methods, systems, system components, or method steps can consist of or consist essentially of—rather than comprise/include/contain/have—any of the described elements, steps, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

BRIEF DESCRIPTION OF THE DRAWINGS

The figures depict an exemplary implementation of a reconstruction-free image recognition method according to an embodiment of the disclosure. The figures also depict exemplary performance results for the reconstruction-free image recognition method according to an embodiment of the disclosure.

The following drawings form part of the present specification and are included to further demonstrate certain aspects of the present disclosure. The disclosure may be better understood by reference to one or more of these drawings in combination with the detailed description of specific embodiments.

DETAILED DESCRIPTION

Figure 1:
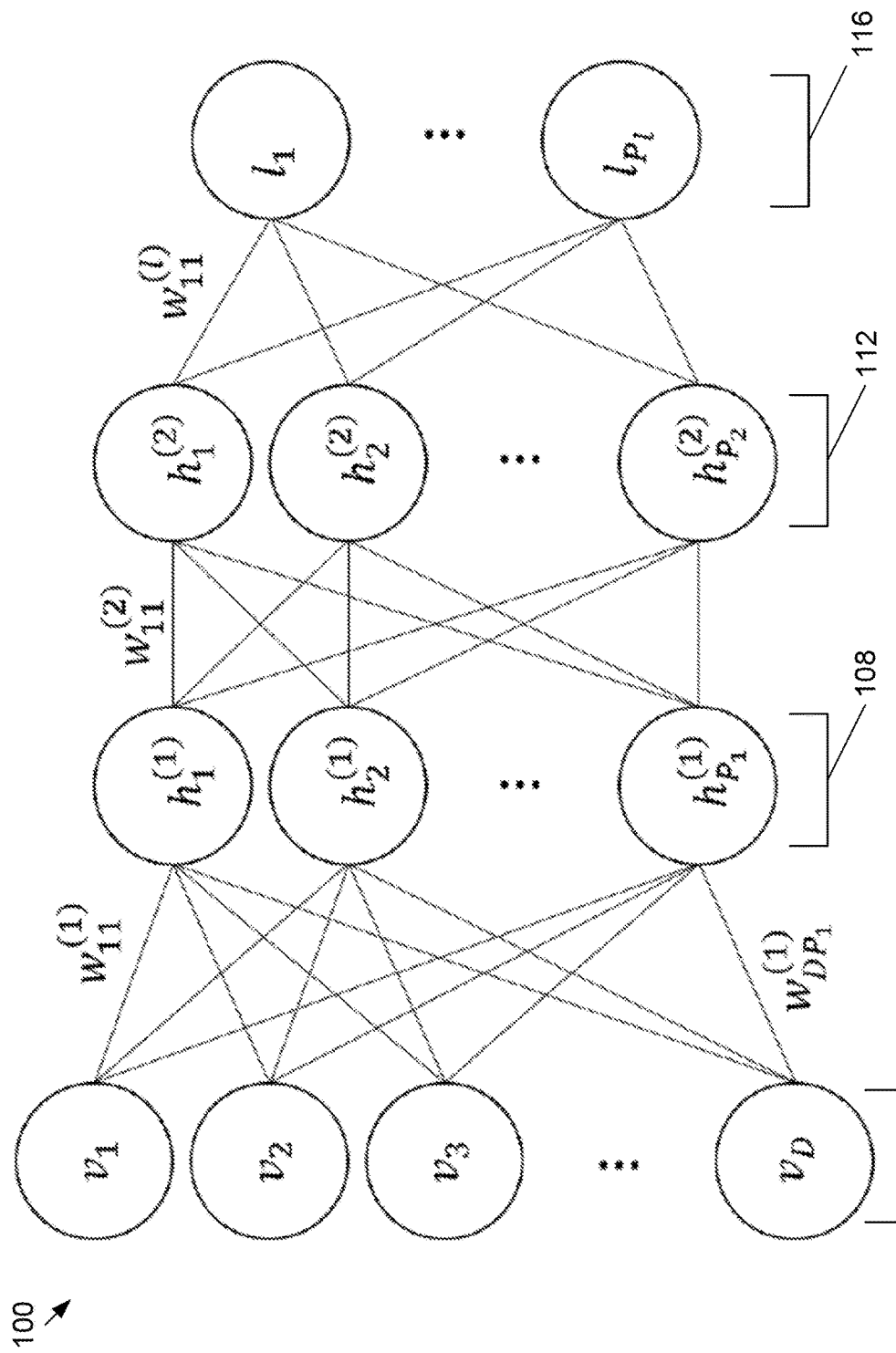
FIG. 1 is a diagram illustrating an exemplary architecture of a Deep Boltzmann Machine (DBM) having two hidden layers according to an embodiment of the disclosure.

In some of the disclose embodiments, a compressive sensing operation consists of measuring a vector $y \in R^{m \times 1}$ which is related to the signal of interest $x \in R^{N \times 1}$ by a linear transformation defined by the known sensing matrix $\Phi \in R^{M \times N}$. $x$ is further known to be k-sparse in some basis $\Psi$. That is, as shown below in Equation (1):

$$y = \Phi x + \eta = \Phi \Psi \theta + \eta \quad (1)$$

where $\eta$ is additive noise and is typically Gaussian distributed, and $\theta$ has at most k non-zero elements. This problem is of interest when M<N; in this case, the sensing operation "compresses" $x$ into a shorter vector $y$. The sensing rate $r = M/N$ and compression ratio $c = 1/r = N/M$ define the level of compression.

Estimating $x$ from a known $\Phi$ and $y$ is an underdetermined problem, traditionally approached by finding a minimum norm solution. Prior knowledge of signal structure can be used, however, to improve reconstruction accuracy. Finding the sparsest possible $\theta$ which satisfies the system requires exponential time and is only feasible for very small N. The convex relaxation of the problem, however, is solvable in polynomial time. This gives $\hat{\theta}$, the estimated value of $\theta$ as shown below in Equation (2):

$$\hat{\theta} = \mathrm{argmin}_{\theta} (\|y - \Phi \Psi \theta\|_2 + + \tau \|\theta\|_1) \quad (2)$$

where $\tau$ is a parameter controlling the trade-off between exactly satisfying $y = \Phi \Psi \hat{\theta}$ and finding the sparsest possible $\hat{\theta}$. The problem in Equation (2) is known as basis pursuit denoising (BPDN). Other related convex reconstruction methods include basis pursuit, in which $\|\theta\|_1$ is minimized subject to the constraint $y = \Phi \Psi \hat{\theta}$, and lasso, in which $\|y - \Phi \Psi \theta\|_2$ is minimized subject to the constraint $\|\theta\|_1 < \epsilon_1$.

It has been shown that for sufficiently large r, with high probability the $l_1$ problem of Equation (2) has the same solution as the equivalent non-convex $l_0$ problem. This result holds as long as the sensing matrix $\Phi$ satisfies Equations (3) and (4) below:

$$(1-\delta)\|x\|_2 \leq \|\Phi x\|_2 \leq (1+\delta)\|x\|_2 \quad (3)$$

$$\forall x : \|x\|_0 < S. \quad (4)$$

with sufficiently small $\delta$. This condition is known as the restricted isometry property (RIP). Many methods of choosing a pseudorandom $\Phi$ satisfy the RIP with high probability for sufficiently large r; however, in some embodiments, a random orthoprojector can be used. The minimum r required for equivalence between the $l_1$ and $l_0$ problems is a function of k/N, the fraction of non-zero components in $\theta$. This limit is known as the Donoho-Tanner phase transition.

Many related convex solvers (e.g. SPGL1) optimize the accuracy and speed of the optimization in Equation (2). Other reconstruction algorithms have been proposed which outperform the optimization in Equation (2) in some way. Orthogonal Matching Pursuit (OMP), Compressive Sampling Matched Pursuit (CoSAMP), and other greedy solvers achieve much faster operation. Generalized Approximate Message Passing (GAMP) has been highly successful in generating high-quality reconstructions at lower computational cost. Variations of OMP and GAMP have even outperformed the Donoho-Tanner phase transition for the noiseless case ($\eta=0$).

Some approaches address the specifics of image and video reconstruction. The SPARCS algorithm models surveillance video as a sum of sparse foreground and low-rank background components. The compressive sensing multi-scale video (CS-MUVI) algorithm uses a specially designed sensing matrix to estimate optical flow in videos; this information is then used to improve reconstruction fidelity by imposing an additional $l_2$ constraint on the optimization problem. This $l_2$ constraint can be replaced with an $l_1$ minimization, taking advantage of empirically observed sparsity of optical flow prediction error.

Relatively little work exists in the field of direct CS inference; most effort has been concentrated on reconstruction algorithms. A correlation based technique has been developed which takes advantage of preservation of inner products under the RIP. This approach, known as the smashed filter, is analogous to the non-compressive matched filter technique. In some of the disclosed embodiments, in a visual tracking scenario, the 2-D cross correlations used by a smashed filter can be performed efficiently using the Fast Fourier Transform (FFT). This approach can be referred to as the fast smashed filter, a name which highlights its compressive nature, computational efficiency, and close relationship to the matched filter. Using maximum average correlation height (MACH) filters trained on multiple targets, it is possible to track vehicles in stationary surveillance video. A sensing matrix $\Phi$ can be chosen using secant projections of training data. This ensures that isometry is preserved on a training dataset, rather than on the set of all k-sparse vectors. The secant projections approach outperforms the smashed filter with random $\Phi$ when noise is present.

According to an embodiment of the disclosure, a reconstruction-free image recognition method performs image classification tasks on data from compressed sensing cameras at lowered computational cost by avoiding full reconstruction of the raw image. The disclosed method meets or exceeds the error rate performance of an equivalent reconstruct-first approach but requires much less time and/or computation resources to execute. This allows lower-cost CS cameras to be deployed in place of conventional sensors without increasing the computational requirements of a system.

In some embodiments, a network-based machine such as a Deep Boltzmann Machine (DBM) can be used to implement a reconstruction-free image recognition method. A DBM is a network-based bio-inspired computational model. Unlike traditional neural networks, Boltzmann machines are generative. That is, they are undirected networks that can be run in reverse to generate example data. They are also stochastic: a node's inputs do not define its output but rather a probability distribution over its possible outputs. FIG. 1 shows an exemplary visual representation 100 of a DBM having a plurality of nodes comprising a visible layer 104, two hidden layers 108, 112, and one or more possible additional layers 116.

A standard single-layer restricted Boltzmann machine (RBM) may consist of a visible layer $v \in \{0, 1\}^{D \times 1}$ and a hidden layer $h \in \{0,1\}^{P \times 1}$ of nodes, with a matrix w of weighted connections between each pair of visible and hidden nodes. The values of the nodes in each layer are conditionally independent given the value of the other layers, with conditional probabilities given by the logistic function of the weighted sum of the other layer's values. The values of the nodes in each layer are conditionally independent given the value of the other layer, with conditional probabilities given by Equations (5) and (6) shown below:

$$p(h_j = 1 \mid v, h_{-j}) = \sigma\left(\sum_i^D w_{ij} v_i\right) \quad (5)$$

$$p(v_i = 1 \mid v, h_{-i}) = \sigma\left(\sum_j^P w_{ij} h_j\right) \quad (6)$$

where $\sigma(x)=1/(1+e^{-x})$ is the logistic function. This conditional independence makes evaluation of the RBM computationally tractable.

The RBM seeks to model a probability distribution over v using the weights W and the values of the hidden layers h. The values v and h therefore form a Markov chain. Exact maximum likelihood training of the RBM is not feasible, but contrastive divergence (CD) learning can build a model of the training dataset by minimizing the difference between a training sample $v_i$ and its reconstruction $\tilde{v}_i$. The RBM concept above can be extended to multiple layers by greedy layer-by-layer pre-training. The first layer weight matrix $W^{(1)}$ can be trained using CD. Then, the hidden-layer $h_1$ corresponding to the first layer of the network can be used as training input to determine the second-layer weights $W^{(2)}$. This may be continued for an arbitrary number of hidden layers. After the pre-training, backpropagation algorithms may be used to fine-tune the network weights.

In this way, the DBM can expand on the Boltzmann machine concept by adding an arbitrarily large number of layers to the network and defining an unsupervised layer-by-layer pre-training step. This pre-training step, and not the number of hidden layers, is what defines this method as a deep learning approach. In a demonstration of the DBM concept on a MNIST (Mixed National Institute of Standards and Technology) dataset, a 0.95% error rate was achieved on the MNIST data using a DBM with 2 hidden layers of 500 and 1000 nodes.

According to an embodiment of the disclosure, a two-stage approach can be used to adapt the DBM for use on CS data. In some embodiments, the DBM is first trained on non-compressive data to generate initial network weights. In some embodiments, the non-compressive data is $x \in R^{N \times 1}$ and generates initial network weights $W_0$. In some embodiments, this network is referred to as the base network. This is done in order to most effectively learn the structure of the training data, before it has been obfuscated by the compressive sensing operation. In some embodiments, a random orthogonal sensing matrix is then chosen. This matrix can determine the measurements taken by the CS sensor. In some embodiments, the sensing matrix $\Phi$ with orthonormal rows is chosen. In some embodiments, an initial guess for the layer-1 weights of the compressive network is chosen by multiplying the base network's layer-1 weights by the sensing matrix and a normalization factor.

In some embodiments, the initial guess for layer-1 weights $W_{CS}^{(1)}$ is chosen according to Equation (7) shown below:

$$W_{CS}^{(1)} = \Phi W^{(1)} \quad (7)$$

where $W^{(1)} \in R^{N \times P_1}$ is the weight matrix containing the first layer weights $W_{ij}^{(1)}$. This can provide an initial guess for a network which performs the same classification task given the M×1 input vector. The RIP implies preservation of inner products, making this a plausible approach.

In some embodiments, for a sensing matrix with orthonormal rows, the normalization factor is the square root of the compression ratio. A compression ratio can be defined as the length of the signal divided by the number of measurements taken by the CS sensor. In some embodiments, this provides an initial guess for a compressive network which performs the same classification task as the base network, but accepts the compressive measurement as input. In some embodiments, the network is then further trained (i.e., stage 2 training) by running one or more backpropagation algorithms on the compressively sensed version of the same training dataset used for the base network. Backpropagation has little effect on the weights of inner layers but these weights have already been optimized by the stage 1 training.

Figure 2:
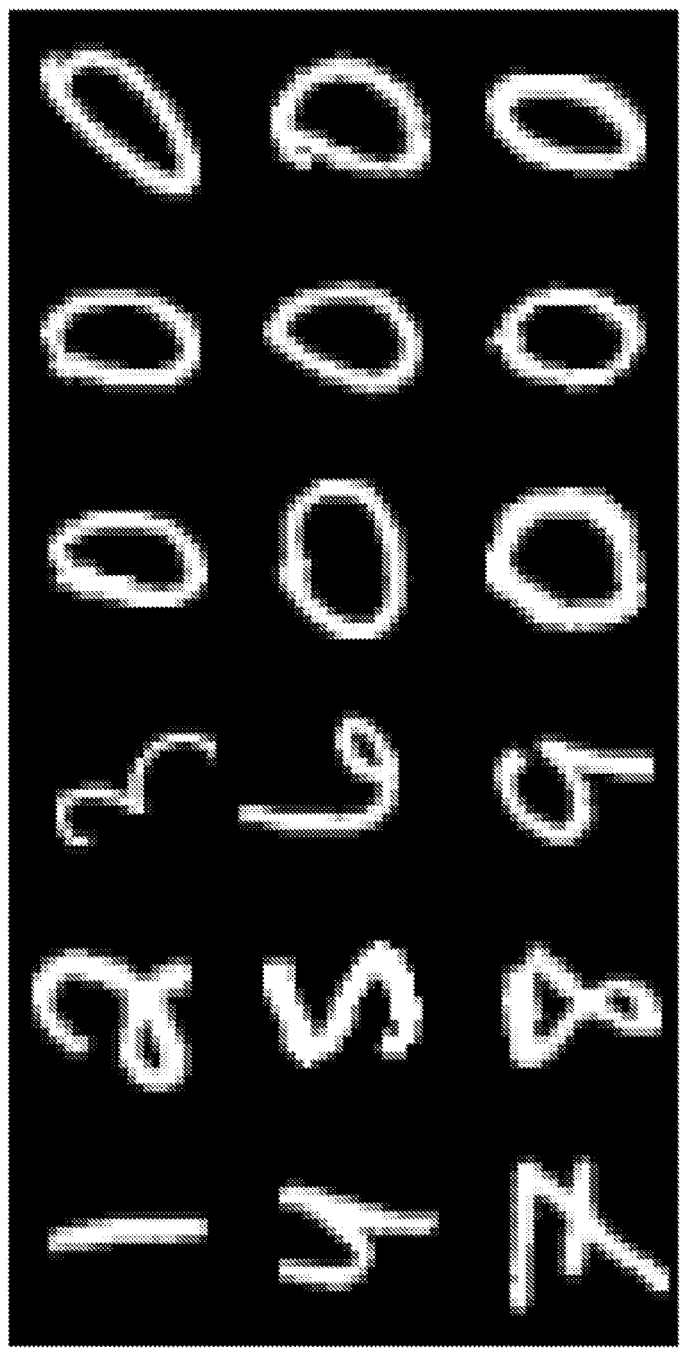
FIG. 2 is a diagram illustrating an exemplary MNIST (Mixed National Institute of Standards and Technology) dataset according to an embodiment of the disclosure.

An exemplary implementation of a reconstruction-free image recognition method according to an embodiment of the disclosure is disclosed below. The training and classification approach described above was tested on a MNIST handwritten digital dataset. As shown in FIG. 2, the dataset 200 consists of a plurality of 28×28 grayscale images of the digits 0-9. These digits can be divided into a training set of 50,000 images and a testing set of 10,000 images. MNIST can be used as an initial dataset for testing because it presents a well-defined problem with adequate training data, and a DBM-based system has already shown high performance on this classification task. Therefore, the effects of adding compressive sensing to the system can be isolated.

Figure 3:
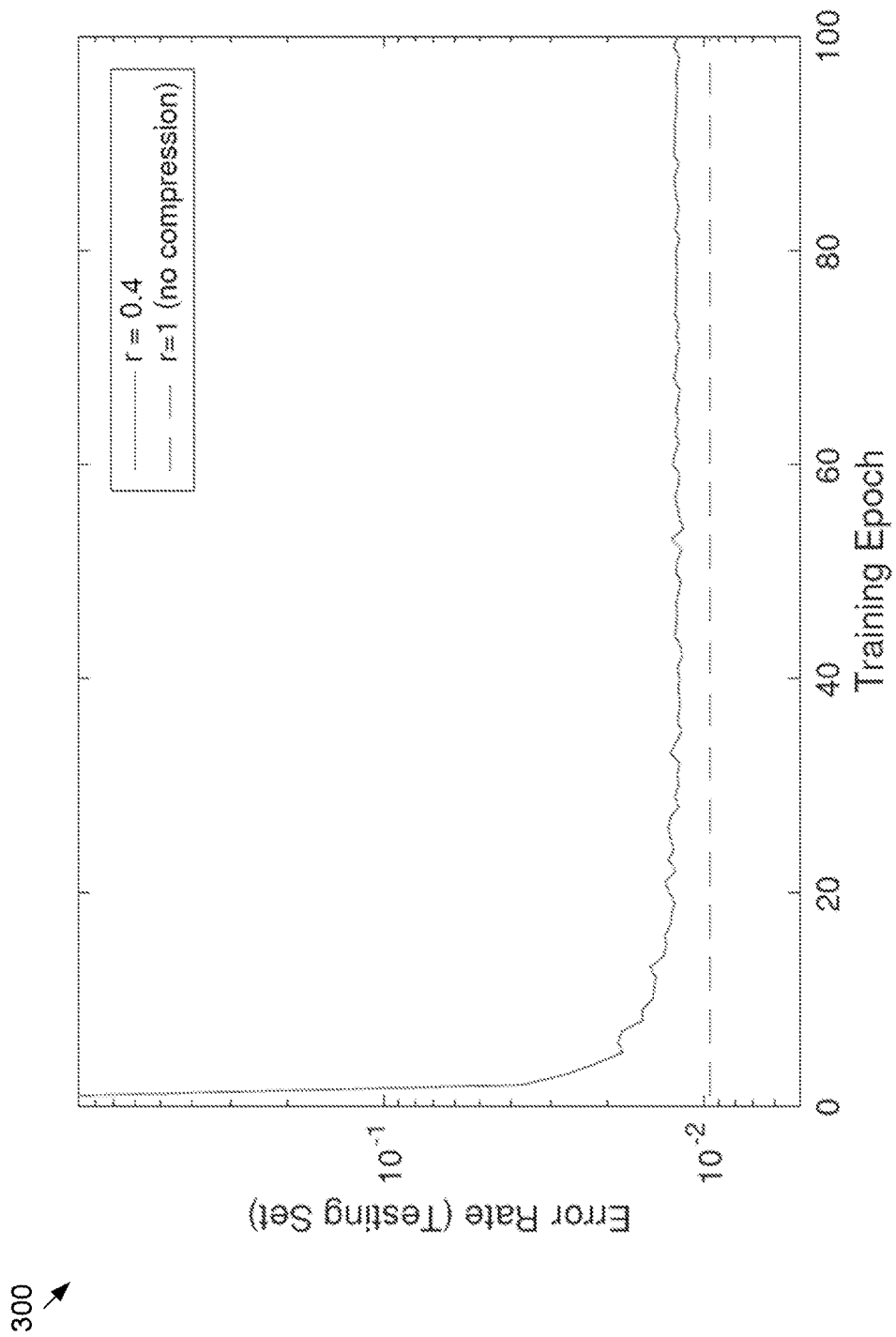
FIG. 3 is a graph illustrating a compressive DBM error during training according to an embodiment of the disclosure.

In the embodiment shown, the initial training uses a DBM with 2 hidden layers (4 layers total). The number of nodes was chosen as in shown in FIG. 1 with D=784, $P_1$=500, $P_2$=1000, and $P_1$=10. A sensing matrix Φ was generated as a random orthoprojector and a DBM was trained as described above. In the embodiment shown, this was repeated with r swept from 0.01 to 0.4. FIG. 3 shows a graph 300 illustrating the progress of stage 2 training, in which backpropagation is used to learn a set of weights specific to the chosen sensing matrix. In graph 300, the progress of the stage 2 training is shown as the compressive DBM error plotted vs. the training time or epoch. The confusion matrix for r=0.4 is given in TABLE I shown below:

handwritten digit dataset was used as a test case, and showed steadily increasing error as measurements were further compressed.

The disclosed embodiments allow for direct processing of compressively sensed data for image classification and/or recognition. The disclosed embodiments also allow for the classification of the compressively sensed data without full image reconstruction using a network-based machine such as a DBM. Previous deep learning approaches to classification have assumed access to the full signal while the disclosed embodiments only require a compressed representation of the signal. At certain levels of under-sampling of data, image reconstruction is impossible. However, by directly processing compressed data, the disclosed embodiments can perform well with substantially under-sampled data such as ~1% of a Nyquist rate. The disclosed embodiments use a two-step training approach for the DBM. The DBM is first trained with non-compressive data and then trained with a compressive version of the same set of data. This training approach can provide flexibility to enable the system to perform well with various different sources of compressive data such as single-pixel cameras, multi-pixel cameras and other suitable compressed sensing sources. The disclosed embodiments enable an end-to-end classification and recognition system for compressively sensed data that runs approximately as quickly as a non-compressive equivalent approach. Therefore, a classifier for compressively sensed data can be determined that shows graceful degradation and outperforms a reconstruct-first approach, especially at extreme compression levels. The disclosed embodiments therefore achieve efficiencies in at least one of sensor cost, computational requirements, and computation performance.

It may be appreciated that the functions described above may be performed by multiple types of software applications, such as web applications or mobile device applications. If implemented in firmware and/or software, the functions described above may be stored as one or more instructions or code on a non-transitory computer-readable medium. Examples include non-transitory, computer-read-

TABLE I

COMPRESSIVE DBM CONFUSION MATRIX, r = 0.4

| | | Predicted Digit (%) | | | | | | | | | |
|---|---|---|---|---|---|---|---|---|---|---|---|
| | | 0 | 1 | 2 | 3 | 4 | 5 | 6 | 7 | 8 | 9 |
| True Digit | 0 | 99.6 | 0 | 0.1 | 0 | 0 | 0 | 0.2 | 0.1 | 0 | 0 |
| | 1 | 0.1 | 99.7 | 0.1 | 0.1 | 0 | 0 | 0 | 0 | 0.1 | 0 |
| | 2 | 0 | 0.4 | 98.9 | 0 | 0 | 0 | 0.1 | 0.5 | 0.1 | 0 |
| | 3 | 0 | 0 | 0.1 | 99.1 | 0 | 0.3 | 0 | 0.1 | 0.3 | 0.1 |
| | 4 | 0 | 0 | 0.1 | 0 | 98.8 | 0 | 0.4 | 0 | 0.1 | 0.6 |
| | 5 | 0 | 0 | 0 | 0.6 | 0 | 99.1 | 0.3 | 0 | 0 | 0 |
| | 6 | 0.3 | 0.2 | 0 | 0 | 0.1 | 0.4 | 98.6 | 0 | 0.3 | 0 |
| | 7 | 0 | 0.2 | 0.6 | 0 | 0 | 0 | 0 | 98.9 | 0 | 0.3 |
| | 8 | 0.3 | 0 | 0.2 | 0.2 | 0.1 | 0.2 | 0.1 | 0.2 | 98.4 | 0.3 |
| | 9 | 0.2 | 0 | 0 | 0 | 0.6 | 0.3 | 0 | 0.5 | 0.4 | 98.0 |

Figure 4:
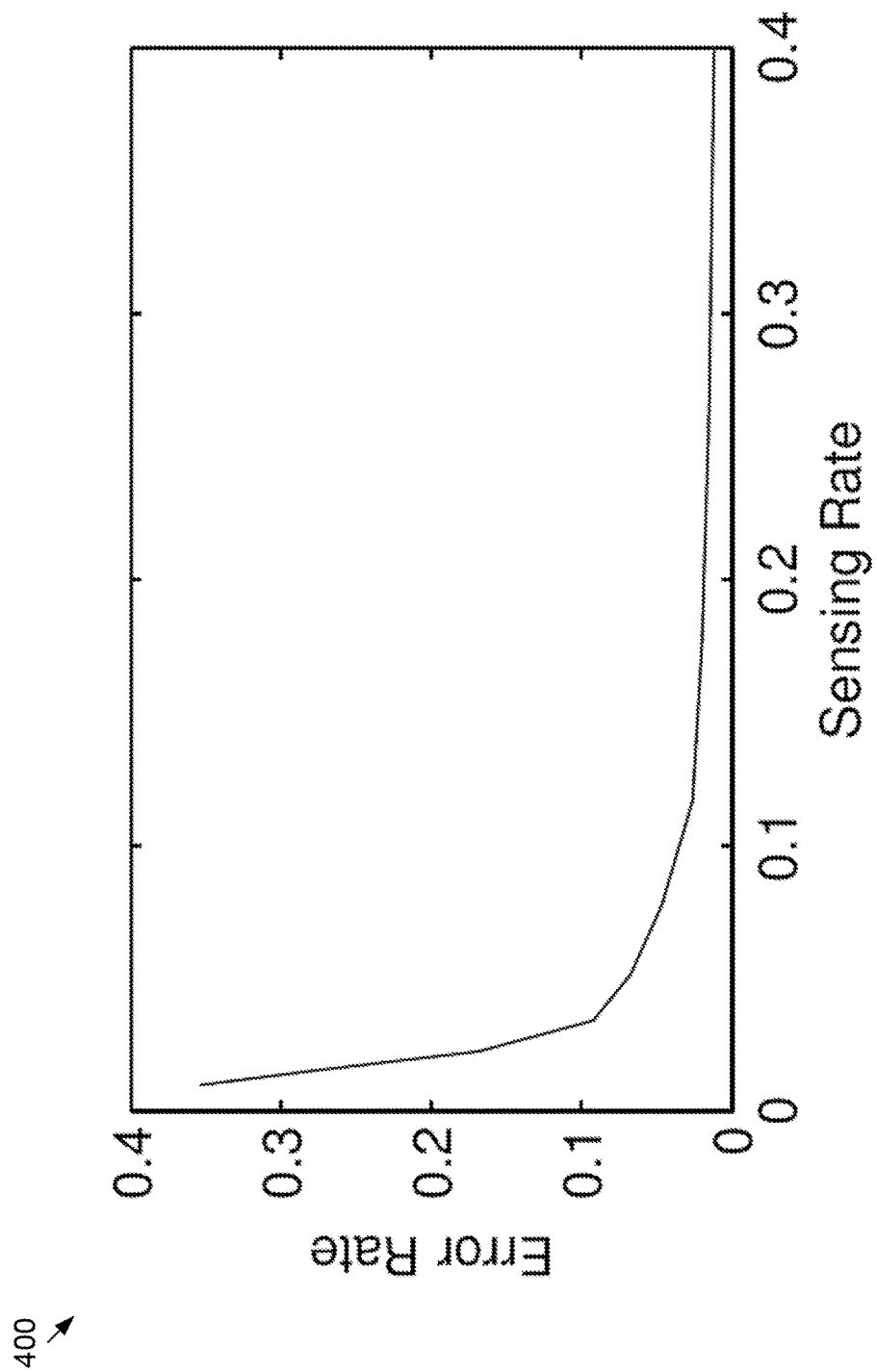
FIG. 4 is a graph illustrating a compressive DBM performance vs. a sensing rate according to an embodiment of the disclosure.

FIG. 4 shows a graph 400 that illustrates the results of this simulation. Graph 400 shows the compressive DBM performance plotted vs. the sensing rate. The network achieves a 1.21% error rate at a sensing rate r=0.4. As expected, reduced sensing rates lead to higher error rates. In addition, the error appears to vary linearly with the compression ratio N/M. Therefore, the training method and simulations described above show that the DBM approach can be used to perform classification directly on CS data. The MNIST able media encoded with a data structure and non-transitory, computer-readable media encoded with a computer program. Non-transitory, computer-readable media includes physical computer storage media. A physical storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In some examples, embodiments of the present disclosure may be implemented in a network and/or cloud environment and may provide the functionality described in the present disclosure as a service to a user and/or customer. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the disclosed methods, devices, and systems are not intended to be limited to the particular forms disclosed. Rather, they include all modifications and alternatives falling within the scope of the claims, and embodiments other than those shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for reconstruction-free image recognition, the method comprising:
    receiving, by a control system comprising at least one processor, an uncompressed dataset;
    training, by the control system, one or more of a machine-learning based classifier, detector, and estimator with the uncompressed dataset;
    determining, by the control system, an orthogonal sensing matrix from the uncompressed dataset;
    receiving, by the control system, a compressed version of the uncompressed dataset; and
    training, by the control system, the one or more machine-learning based classifier, detector, and estimator with the compressed dataset.

2. The method of claim 1, the training with the uncompressed dataset comprising:
    determining, by the control system, one or more initial network weights; and
    generating, by the control system, a base network based on the determined one or more initial network weights.

3. The method of claim 1, the training with the compressed dataset comprising:
    executing, by the control system, one or more backpropagation processes on the compressed dataset.

4. The method of claim 2, further comprising:
    determining, by the control system, an initial guess for a compressive network based on the one or more initial network weights.

5. The method of claim 4, the determining the initial guess comprising:
    multiplying, by the control system, the one or more initial network weights by the orthogonal sensing matrix and a normalization factor.

6. The method of claim 5, wherein the normalization factor is a square root of a compression ratio of the compressed dataset.

7. The method of claim 3, further comprising:
    determining, by the control system, one or more compressive network weights based on a result of the one or more backpropagation processes.

8. The method of claim 1, further comprising:
    determining, by the control system, an initial guess for a compressive network based on the one or more initial network weights.

9. The method of claim 1, further comprising:
    receiving, by the control system, a compressed dataset from a compressed image sensor; and
    classifying, by the control system, compressed data in the compressed dataset without reconstruction of the compressed data.

10. The method of claim 1, wherein the one or more machine-learning based classifier, detector, and estimator comprises a neural network.

11. The method of claim 10, wherein the one or more machine-learning based classifier, detector, and estimator comprises a generative, stochastic neural network.

12. The method of claim 11, wherein the one or more machine-learning based classifier, detector, and estimator comprises a deep Boltzmann machine (DBM).

13. A system for reconstruction-free image recognition, the system comprising:
    one or more compressed image sensors; and
    a control system comprising at least one processor configured to:
        receive an uncompressed dataset;
        train one or more of a machine-learning based classifier, detector, and estimator with the uncompressed dataset;
        determine an orthogonal sensing matrix from the uncompressed dataset;
        receive a compressed version of the uncompressed dataset;
        train the one or more machine-learning based classifier, detector, and estimator with the compressed version of the uncompressed dataset;
        receive a compressed dataset from the one or more compressed image sensors; and classify compressed data in the compressed dataset without reconstruction of the compressed data.

\* \* \* \* \*